US010899233B2

United States Patent
Heusinkveld et al.

(10) Patent No.: US 10,899,233 B2
(45) Date of Patent: Jan. 26, 2021

(54) POWER CONVERTER FOR ELECTRIC VEHICLE

(71) Applicant: E-TRACTION EUROPE B.V., Apeldoorn (NL)

(72) Inventors: Jorrit Job Heusinkveld, Arnhem (NL); Patrick Johannes Christiaan Hendriks, Arnhem (NL)

(73) Assignee: E-TRACTION EUROPE B.V., Apeldoorn (NL)

( * ) Notice: Subject to any disclaimer, the term of this patent is extended or adjusted under 35 U.S.C. 154(b) by 655 days.

(21) Appl. No.: 15/107,163

(22) PCT Filed: Dec. 24, 2014

(86) PCT No.: PCT/NL2014/050911
§ 371 (c)(1),
(2) Date: Jun. 22, 2016

(87) PCT Pub. No.: WO2015/099537
PCT Pub. Date: Jul. 2, 2015

(65) Prior Publication Data
US 2017/0028856 A1    Feb. 2, 2017

(30) Foreign Application Priority Data

Dec. 24, 2013   (NL) .................................. 2012027

(51) Int. Cl.
*B60L 1/00*      (2006.01)
*B60L 3/00*      (2019.01)
(Continued)

(52) U.S. Cl.
CPC ......... *B60L 11/1803* (2013.01); *B60L 3/0084* (2013.01); *B60L 50/51* (2019.02);
(Continued)

(58) Field of Classification Search
CPC ...... B60L 11/1803; B60L 50/51; B60L 58/10; B60L 58/20; B60L 3/0084; B60L 50/64;
(Continued)

(56) References Cited

U.S. PATENT DOCUMENTS 5,796,175 A * 8/1998 Itoh ........................ B60L 3/0023
                                                    307/10.1
6,923,279 B2 * 8/2005 Shimane .................. B60K 6/28
                                                    180/65.1
(Continued)

FOREIGN PATENT DOCUMENTS

EP    1 252 034 B1    10/2002
EP    2 426 005 A2     3/2012
(Continued)

OTHER PUBLICATIONS

Bob Bell: "Operation and Benefits of Active-Clamp Forward Power Converters", Technical Documents, Dec. 7, 2011 (Dec. 7, 2011), XP002729001, Retrieved from the Internet <URL:http://www.ti.com/lit/an/snva591/snva591.pdf> [retrieved on Aug. 28, 2014].
(Continued)

*Primary Examiner* — Kenneth B Wells
(74) *Attorney, Agent, or Firm* — Nixon & Vanderhye (57) ABSTRACT

A vehicle having a high voltage power source for operating high voltage devices, such as in-wheel electric motors for propelling the vehicle. The high voltage in-wheel electric motors are controlled by dedicated controllers paired with the devices and requiring low voltage power. The vehicle includes one or more converters paired with the dedicated controller(s) and for converting high voltage power to low voltage power suitable for powering the controllers.

14 Claims, 7 Drawing Sheets

(51) Int. Cl.
  *B60L 15/20* (2006.01)
  *B60L 11/18* (2006.01)
  *B60L 50/51* (2019.01)
  *B60L 58/10* (2019.01)
  *B60L 58/20* (2019.01)
  *H02M 7/537* (2006.01)
  *B60L 50/64* (2019.01)

(52) U.S. Cl.
  CPC .............. *B60L 58/10* (2019.02); *B60L 58/20* (2019.02); *H02M 7/537* (2013.01); *B60L 1/00* (2013.01); *B60L 50/64* (2019.02); *B60L 2210/12* (2013.01); *B60L 2220/44* (2013.01); *B60L 2270/147* (2013.01); *B60L 2270/40* (2013.01); *Y02T 10/64* (2013.01); *Y02T 10/70* (2013.01); *Y02T 10/72* (2013.01)

(58) Field of Classification Search
  CPC .. B60L 1/00; B60L 2270/147; B60L 2220/44; B60L 2210/12; B60L 2270/40; H02M 7/537; Y02T 10/646; Y02T 10/706; Y02T 10/7006; Y02T 10/7233
  See application file for complete search history.

(56) References Cited

U.S. PATENT DOCUMENTS

| | | | |
|---|---|---|---|
| 8,039,976 B2* | 10/2011 | Sato | B60K 6/48 |
| | | | 290/40 C |
| 8,466,580 B2* | 6/2013 | Viancino | B60L 3/0069 |
| | | | 307/9.1 |
| 9,321,370 B2* | 4/2016 | Higashitani | B60L 50/51 |
| 9,340,123 B2* | 5/2016 | Jang | B60L 11/1868 |
| 9,381,826 B2* | 7/2016 | Wu | B60L 15/209 |
| 9,662,984 B2* | 5/2017 | Park | B60L 58/20 |
| 2010/0225164 A1 | 9/2010 | Tran et al. | |
| 2014/0152076 A1 | 6/2014 | Volger et al. | |

FOREIGN PATENT DOCUMENTS

| | | |
|---|---|---|
| EP | 2 641 771 A1 | 9/2013 |
| GB | 2 440 251 B1 | 6/2011 |
| WO | 2011/125084 A1 | 10/2011 |
| WO | 2013/026659 A2 | 2/2013 |

OTHER PUBLICATIONS

International Search Report, dated Apr. 15, 2015, from corresponding PCT application.

\* cited by examiner

Fig. 7

POWER CONVERTER FOR ELECTRIC VEHICLE

FIELD OF THE INVENTION

The invention relates generally a system for providing low voltage power to controllers in an electric vehicle.

BACKGROUND OF THE INVENTION

Electric vehicles are known in the art. In general such vehicles comprise one or more electric motors for driving one or more of the wheels of the vehicle. Power for the one or more electric motors is provided by a power source, such as a storage battery, one or more fuel cells, a generator, for example powered by an internal combustion engine, and the like. As the electric motor(s) require power in the tens of kilowatts or more, it is desirable to provide a high voltage power source, so as to keep the electric currents in the power supply lines within reasonable limits. Power sources providing power in the range of 150 to 800 Volts are commonly used for this purpose.

In general electric vehicles comprise a variety of auxiliaries, such as lights (including headlights, tail lights, brake lights, interior lights), audio equipment, navigation equipment, engine and vehicle monitoring devices, and the like. These auxiliaries generally are of a type commonly used in vehicles powered by internal combustion engines, and are designed to be powered by a low voltage power source, e.g. 12 Volts or 24 Volts. Accordingly, electric vehicles generally are equipped with two electric power sources, a high voltage power source for powering the electric motor or motors, and a low voltage power source for powering the various conventional auxiliaries.

Electric motors driving an electric vehicle require controllers that control the power input and output to and from the electric motors. Such controllers require a low voltage power source for their operation. It is common to use the low voltage power source present in electric vehicles for powering the conventional auxiliaries for also powering the controllers. It has been found, however, that this solution is associated with a number of disadvantages.

It is desirable to place a motor controller as close to the motor as possible. For example, the controller of an in-wheel electric motor is preferably placed within the wheel containing the motor. Thus, the wheel must be equipped with dual power lines, i.e. a high voltage power line for powering the motor, and a low voltage power line for powering the controller.

It has been found that the dual power line solution is subject to reliability problems due to the dependency of externally supplied low voltage power. The low voltage power source may exhibit excessive voltage fluctuations. Such fluctuations may be caused by peak demands on the low voltage power supply, and occasional short circuits. These and other causes of voltage fluctuations are listed in ISO 16750-2, the disclosures of which are incorporated herein by reference.

It has also been found that the dual power line solution makes it difficult to comply with Regulation No. 10 of the Economic Commission for Europe of the United Nations (UN/ECE)—Uniform Provisions concerning the approval of vehicles with regard to electromagnetic compatibility ("R 10").

Thus, there is a need for a power supply to controllers in an electric vehicle that mitigates the problems associated with the dual supply line solution.

SUMMARY OF THE INVENTION

The present invention addresses these problems by providing a vehicle comprising:
a. a high voltage DC power source;
b. at least one device designed to be powered by the high voltage power source;
c. a dedicated controller paired with the at least one device for controlling the operation of the at least one device, said controller being designed to be powered by a low voltage power source;
d. a converter paired with the dedicated controller for converting power from the high voltage power source to low voltage power for directly powering the controller.

Another aspect of the invention comprises a kit for converting a vehicle to electric drive, said kit comprising:
a. a high voltage DC power source;
b. at least one device designed to be powered by the high voltage power source;
c. a dedicated controller for pairing with the at least one device and for controlling the operation of the at least one device, said controller being designed to be powered by a low voltage power source;
d. a converter for pairing with the dedicated controller and for converting power from the high voltage power source to low voltage power for directly powering the controller.

BRIEF DESCRIPTION OF THE DRAWINGS

The invention will be explained with reference to the drawing figures.

FIGS. 1 through 7 represent circuit diagrams of a specific embodiment of the invention, of which

DETAILED DESCRIPTION OF THE INVENTION

The following is a detailed description of the invention.
Definitions

The term "R 10" as used herein means the Regulation No. 10 of the Economic Commission for Europe of the United Nations (UN/ECE) Uniform Provisions concerning the approval of vehicles with regard to electromagnetic compatibility. R 10 is applicable in the countries of the European Union. Other geographic regions have similar electromagnetic compatibility ("EMC") regulations, which are included in the term "R 10."

The term "inverter" as used herein means an electrical power converter that converts direct current (DC) to alternating current (AC). It will be understood that in specific applications bi-directional inverters may be used. For example, a brushless electric motor may be used for propelling a vehicle, and may also be used as a generator during regenerative braking. In the latter mode the inverter actually converts alternating current generated by the motor to direct current.

In its broadest aspect the present invention relates to a vehicle comprising:
- a high voltage DC power source;
- at least one device designed to be powered by the high voltage power source;
- a controller for controlling the operation of the at least one device, said controller being designed to be powered by a low voltage power source;
- a converter for converting power from the high voltage power source to low voltage power for directly powering the controller.

The vehicle can be any electric vehicle. The vehicle can have one electric motor, or a plurality of electric motors. The vehicle may in addition comprise an internal combustion engine, which may power one or more of the wheels in any type of hybrid set-up, or the internal combustion engine may provide electrical power for powering the one or more electric motors. In a specific embodiment the vehicle is equipped with one or more (for example two) wheels having an in-wheel electric motor, for example as described in EP 1 252 034 B1; GB 2440251 B1; and WO 2013/026659 A2. The at least one device designed to be powered by a high voltage power source is, for example, the electric motor or motors.

It will be understood that other devices on board the vehicle may be powered by the high voltage power source. Examples include electric motors that operate auxiliaries such as a water pump, an air compressor, a hydraulic pump, an air conditioning compressor, and the like. In general any device on board the vehicle having a power demand in excess of 100 Watts can suitably be powered by the high voltage power source.

The high voltage power source provides power having a voltage in the range of from 100 Volts to 1000 Volts, preferably from 150 to 800 Volts. The high voltage power source typically produces DC power. Examples include storage batteries, photovoltaic cells, fuel cells, generators, and the like. It will be understood that the advantages of the present invention can be obtained with any electric vehicle, independent from the specific type of high voltage power source that is used.

The device powered by the high voltage power source is paired with a controller for controlling the operation of the device. It is possible to have two or more devices share a common controller. It is desirable to place the controller in close proximity to the device or devices being controlled. For example, if the device is an in-wheel motor, the controller is preferably placed within the wheel containing the motor.

The controller is powered by a low voltage power source, for example 12 Volts or 24 Volts. Conventionally the vehicle is equipped with a low voltage power source for powering wind shield wipers, head lights, dome lights, brake lights, rear lights, and the like. Dependent on the type of vehicle the low voltage power source may provide 12 Volts or 24 Volts of DC power. For example, passenger cars may comprise a 12 Volts power source; trucks and busses may have a 12 Volts power source or a 24 Volts power source. The power source may comprise one or more storage devices, such as lead/acid batteries.

It is common to use the low voltage power supply of the vehicle to also supply power to the controller or controllers controlling the device or devices that are powered by the high voltage power source. As the controller desirably is placed in close proximity to the device, the conventional approach requires dual power lines to the device, that is, a high power voltage line to the device itself, and a low voltage line to the controller. This adds to the complexity of the vehicle.

A serious drawback of the dual power line approach is that the low voltage power source may experience serious voltage drops. Such voltage drops may be caused by sudden peak demands on the low voltage power source. For example, in a rain storm the driver of the vehicle may simultaneously turn on a heater blower, windshield wipers, a rear window defroster and an air conditioning compressor in order to maintain visibility through the windshield and the rear window. This could cause the voltage to temporarily drop below the minimum needed to operate the controller, which may cause dangerous situations. Offer potential causes of such voltage drops are listed in ISO16750-2.

The effects of such voltage drops on the controller may be mitigated by providing compensating circuitry, such as a capacitor pack. Such compensating circuitry poses EMC problems. Accordingly, it has been found very difficult to build electric components for electric vehicles that are individually compliant with R10. Instead the practice has been to shield such components after placement in the vehicle, and test the vehicle as a whole for R10 compliance. It is, however, preferable to achieve R10 compliance for each individual component.

The vehicle of the present invention instead uses the high voltage DC power source to provide power to both the device and the controller. Accordingly one power line is needed. The controller is paired with a converter for converting power from the high voltage power source to low voltage power for directly powering the controller.

It is known to use converters in electric vehicles for converting high voltage DC power to low voltage DC power, for keeping the battery or batteries of the low voltage power system sufficiently charged. It is also known to then use the low voltage DC power to provide power to controllers in the vehicle. In this prior art set-up the controllers are powered by step-down converters, but only indirectly. The present invention ensures that the power supply to the controllers is not affected by fluctuations in the low voltage DC power supply, by providing power directly from the converter to the controller.

In an alternate embodiment the controller is additionally connected to the low voltage power supply of the vehicle, so as to provide a back-up in case of malfunction of the converter.

It has been found that the converter can be configured to be R10 compliant.

In an embodiment the vehicle comprises a plurality of devices powered by the high voltage power source. The devices may comprise one or more electric motors, for example in-wheel electric motors, for propelling the vehicle; and one cc more electric motors for operating auxiliary devices such as a water pump, an air compressor, a hydraulic pump, an air conditioning compressor, and the like.

It will be understood that one or more of the auxiliary devices may have a safety-related function, such as braking, power steering, and the like. An important advantage of this particular embodiment of the present invention is that both the safety-related auxiliary device and its controller receive power while there is power for the electric motors that propel the vehicle.

In an embodiment each of the devices designed to be powered by the high voltage power source is paired with a dedicated controller for controlling the operation of the device with which it is paired.

In an embodiment a device is an electric motor, and the dedicated controller with which the electric motor is paired is part of an inverter. The electric motor can be designed for propelling the vehicle.

The converter can be a step-down converter, for example an isolated step-down converter or a non-isolated step-down converter. Examples of suitable converters include flyback converters, buck converters and LLC converters. Preferred for use herein are flyback converters. Particularly preferred are flyback converters comprising an active clamp controller. The converter can include a compensator for improved voltage control. The converter may further comprise an input filter and/or an output filter. These filters contribute to R10 compliant operation of the converter.

In use the converter provides its own low voltage power supply from the high voltage power supply. The converter can be provided with a start-up circuit to provide the converter with low voltage power during start-up. In case the controller is also connected to the low voltage power source of the vehicle the start-up circuit may be omitted. However, for true redundancy it is preferred to include a start-up circuit even in this set-up.

The invention is particularly suitable for road vehicles, as the converter can be made compliant with road vehicle standards, such as R10. The converter does not require the use of an optocoupler, which avoids the associated costs and reliability issues

DESCRIPTION OF ILLUSTRATIVE EMBODIMENTS/EXAMPLES

The following is a description of certain embodiments of the invention, given by way of example only.

Figure 1:
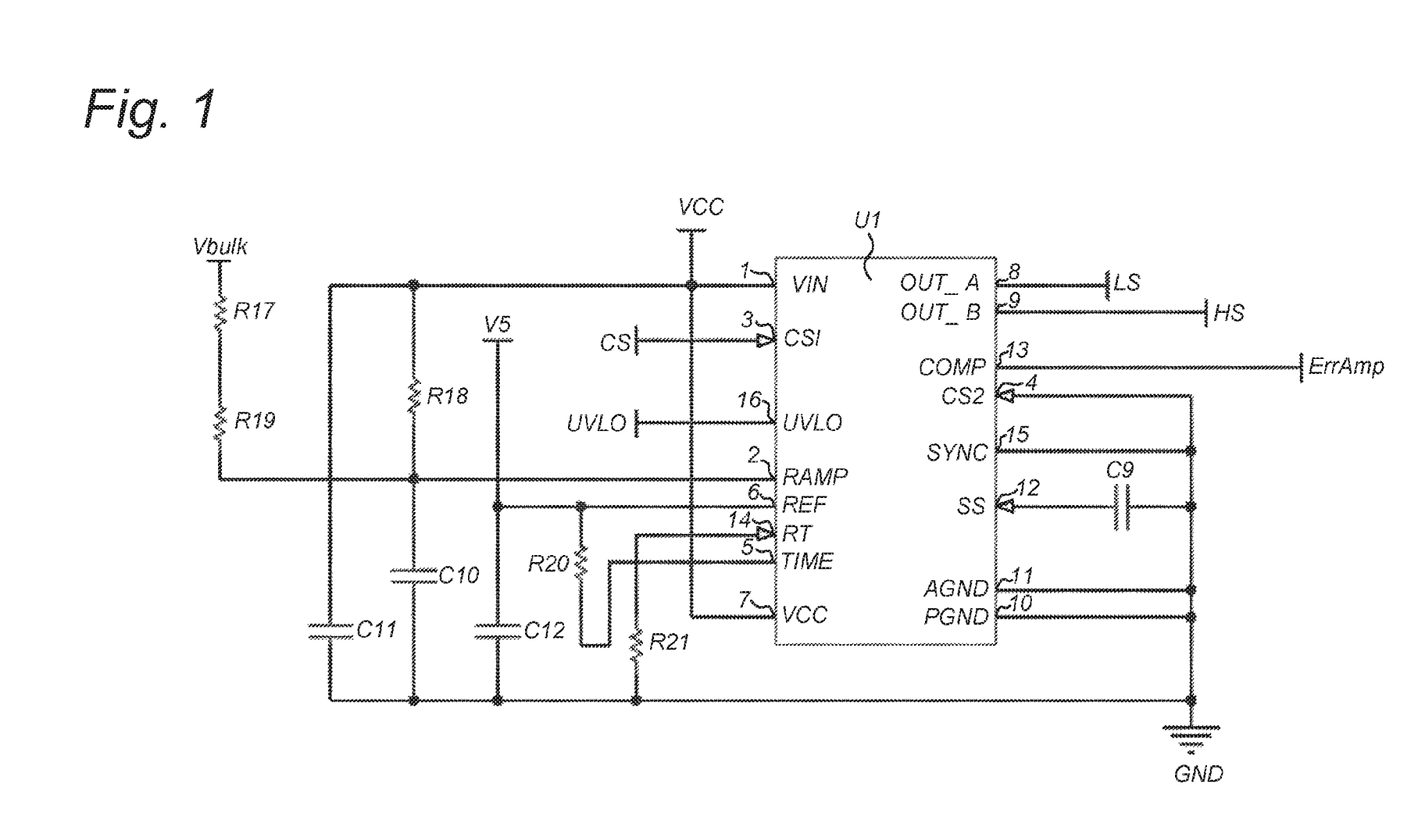
FIG. 1 shows a controller portion.

The invention will be illustrated with reference to an active clamp flyback converter. It will be understood that other step-down converters may be used instead of the flyback converter. FIG. 1 shows the heart of the circuit, i.e., the controller itself.

In the embodiments shown in the figures the various elements have the values or are of the types as given in the below tables. Elements in the figures and in the description which are indicated by a reference symbol having the letter 'R' followed by a number designate an electrical resistor; elements indicated by a reference symbol having the letter 'C' followed by a number designate a capacitor; elements indicated by a reference symbol having the letter 'D' or 'Z' followed by a number designate a diode and Zener diode, respectively; elements indicated by a reference symbol having the letter 'L' or 'T' followed by a number designate an inductor and transformer, respectively; and elements indicated by a reference symbol having the letter 'Q', 'U' or followed by a number designate a transistor, an IC or an operational amplifier, of which pin numbers and specific pin designations are shown in the figures. Reference symbols starting with a 'V' indicate an electric potential, V5 specifically indicating an electric potential of 5 volts, and 'HV' indicates a high voltage. The figures are drawn with drawing conventions as are customary in the field. The figures show an example only; other values and/or types of the elements can be used as well. The resistors R28 and R34 are actually not placed in the electrical schemes of the figures, meaning that they effectively have an infinite resistance.

Integrated circuit U1 is an active clamp controller, especially an LM50250 active clamp controller having the various pin numbers and pin designations as indicated in the figure. The LM50250 active clamp controller programming can be found in its datasheet. It is programmed for a dead time of 400 ns and a switching frequency of 100 kHz. Resistors R17, R19, and R18 and capacitor C10 implement the flyback open loop transfer function for feed forward compensation. More specifically, an LM5025CMTCE/NOPB active clamp controller U1 is employed in the embodiment shown.

TABLE 1

| Resistor values |
|---|
| R1: 10Ω |
| R2: 1 MΩ |
| R3: 1 MΩ |
| R4: 2.2Ω |
| R5: 47Ω |
| R6: 1 MΩ |
| R7: 1 MΩ |
| R8: 1 kΩ |
| R9: 10 kΩ |
| R10: 10Ω |
| R11: 1 MΩ |
| R12: 42.2 kΩ |
| R13: 1 MΩ |
| R14: 10Ω |
| R15: 1 kΩ |
| R16: 470 mΩ |
| R17: 1 MΩ |
| R18: 71.5 kΩ |
| R19: 1 MΩ |
| R20: 130 kΩ |
| R21: 64.9 kΩ |
| R22: 18 kΩ |
| R23: 4.7 kΩ |
| R24: 86 kΩ |
| R25: 33Ω |
| R26: 10 kΩ |
| R27: 86.6 kΩ |
| R28: Not Placed |
| R29: 10 kΩ |
| R30: 330 mΩ |
| R31: 470Ω |
| R32: 2.2 kΩ |
| R33: 1 kΩ |
| R34: Not Placed |
| R35: 10 kΩ |
| R36: 10 kΩ |
| R38: NTC Inrush Current Limiter 50Ω |

TABLE 2

| Capacitor values |
|---|
| C1: 470 nF |
| C2: 470 nF |
| C3: Cap Poll 10 µF |
| C4: 1 nF |
| C5: 100 nF |
| C6: Cap Poll 10 µF |
| C7: 47 nF |
| C8: 220 pF |
| C9: 100 nF |
| C10: 820 pF |
| C11: 100 nF |
| C12: 100 nF |
| C13: 180 pF |
| C14: 1 nF |
| C15: (Cap Poll) 180 µF |
| C16: (Cap Poll) 180 µF |
| C17: (Cap Poll) 1 mF |
| C18: 100 nF |
| C19: 10 nF |
| C20: (Cap Poll) 180 µF |
| C21: (Cap Poll) 180 µF |
| C22: (Cap Poll) 180 µF |
| C23: 820 pF |

TABLE 2-continued

Capacitor values

C24: 22 µF
C25: 100 nF
C26: 1 µF
C27: 100 nF
C28: Cap Poll 10 µF
C29: Cap Poll 10 µF

TABLE 3

Diode and Zener diode types

D1: US1M
D2: BAT54S
D3: MBRB20100CT
D4: Diode 1N4007
D5: Diode 1N4007
D6: BAT54A
D10: Diode 1N4007
Z1: BZG03C12TR
Z2: BZX84-C, Voltage: 15 V

TABLE 4

Inductor values/types and Transformer types

L1: 220 µH/744066221
L2: 10.0 µH/744065100
L3: 220Ω/742792022
T1: 029900905
T2: PA0184NLT

TABLE 5

Transistor, IC and Operational amplifier types

Q1: IXFA3N120          U1: LM5025CMTCE/NOPB
Q2: MMBT2907LT1    U2: AD8601ARTZ
Q3: IXFA3N120          J1: 662004231722 or 66200421122
Q4: IXTY01N100D(-ND)
Q5: MMBT3904

Figure 2:
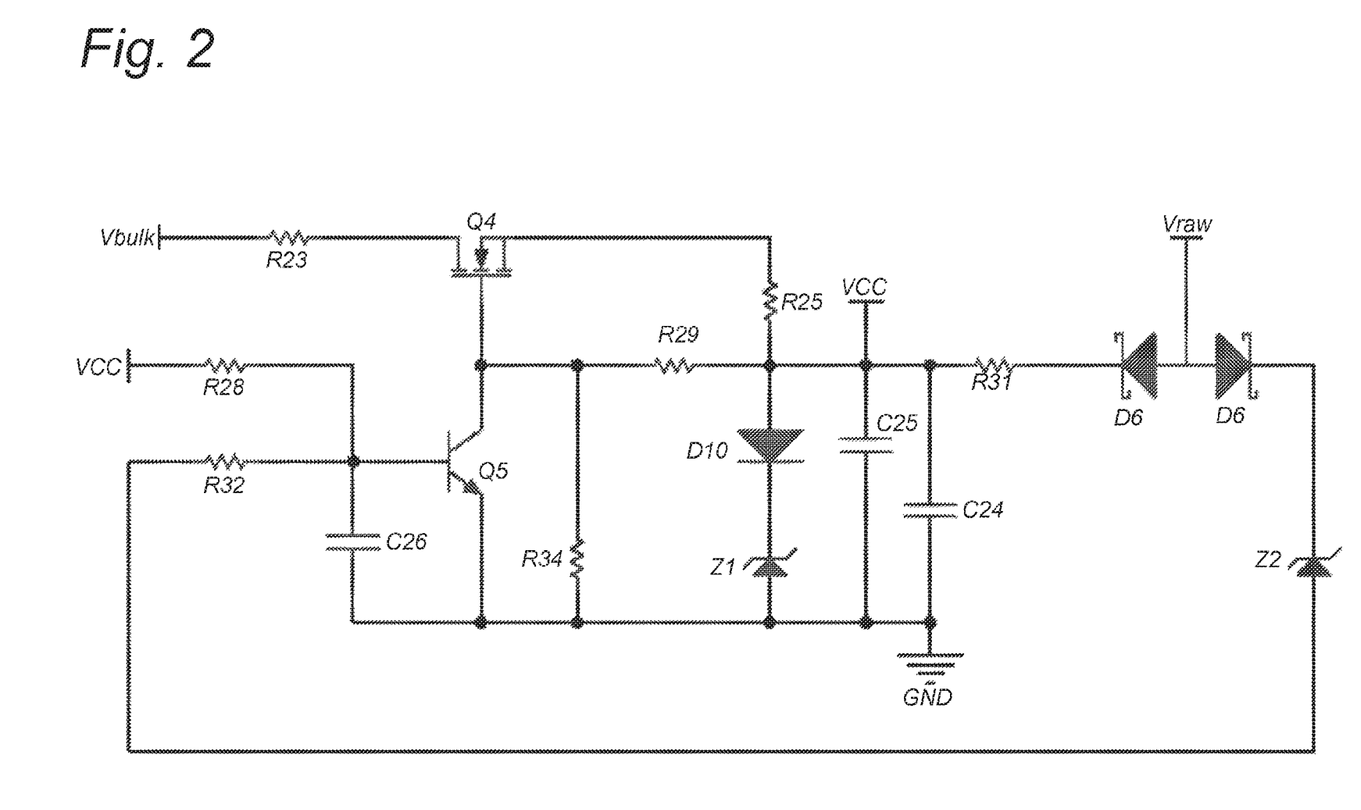
FIG. 2 shows a start-up circuit.

The controller IC U1 is normally fed back from the output voltage. Because initially there is no output voltage available the controller has to start up from the high input voltage. The start up circuit is shown in FIG. 2.

Q4 is a depletion mode mosfet configured as a current source of about 10 mA. The output is voltage limited with zener diode Z1. The controller is fed from Vcc. When the output voltage Vraw reaches approx. 16 Volt, Q4 is turned off by Q5 and from that point forward Vcc is generated from the output voltage.

Figure 3:
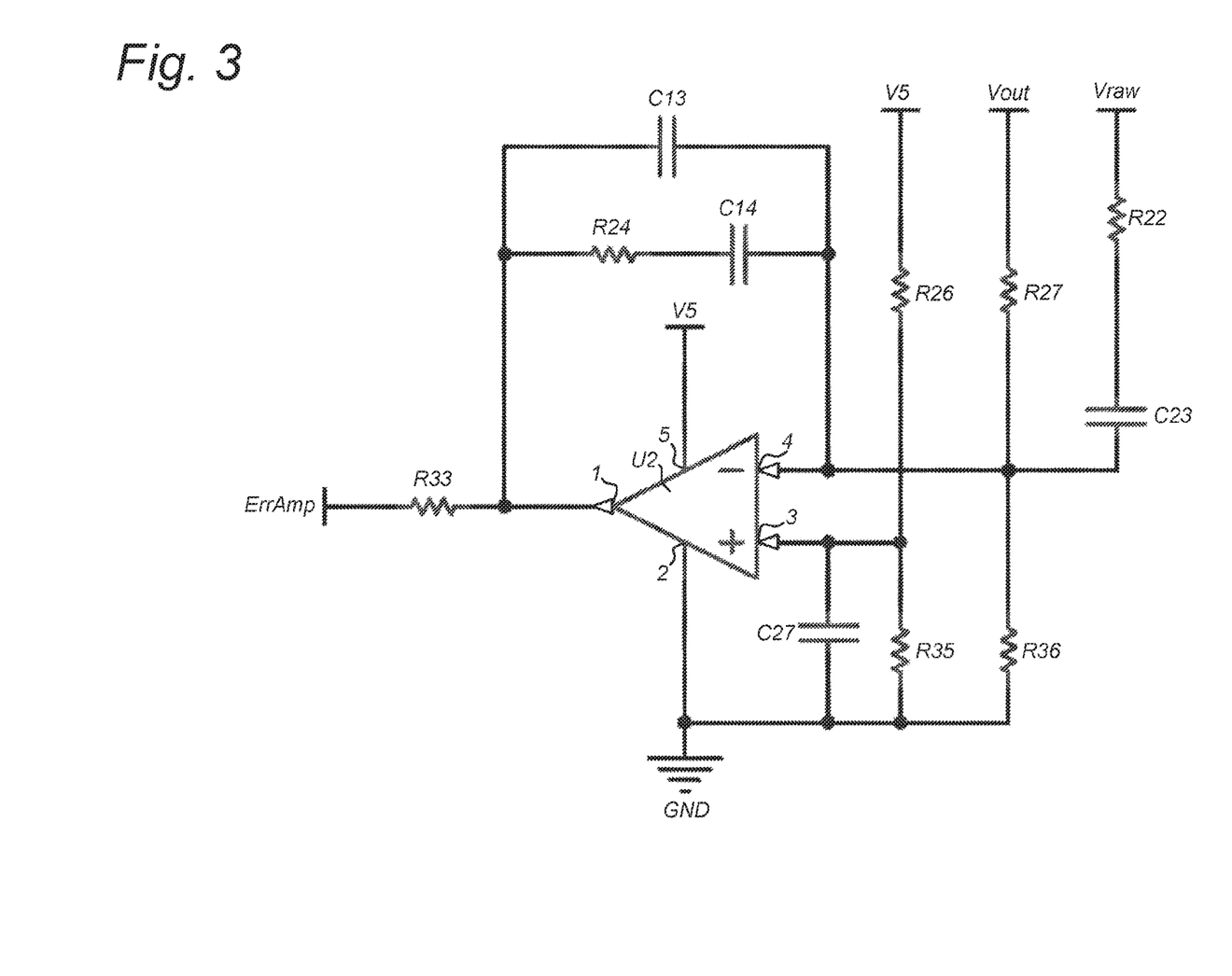
FIG. 3 shows a compensation loop.

A compensation loop is desirable for control of the output voltage. For isolated flyback converters this is usually done with a combination of a TL431 and an optocoupler. Because there is no need for galvanic isolation, a normal opamp can be used and optocoupler aging problems are avoided. The circuit is shown in FIG. 3. The opamp is configured as a type 3 compensator. The loop is closed with crossover frequency of 5 kHz with a phase margin of 81 degrees.

Figure 4:
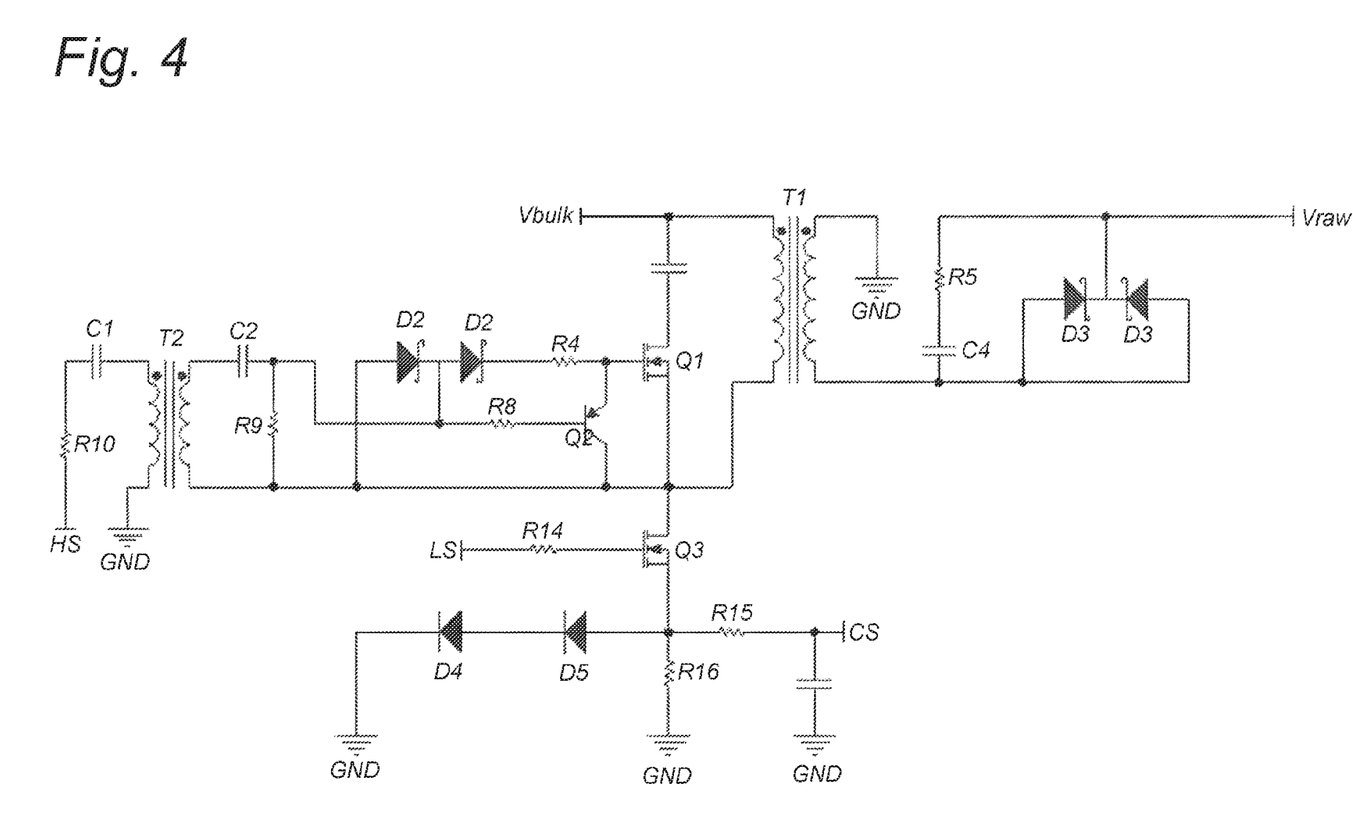
FIG. 4 shows a flyback converter

FIG. 4 illustrates the operation of the flyback converter. Q3, D3 and Ti form the heart of the flyback converter. When Q3 closes, D3 is blocking and the primary inductance is charged. When it is released the stored energy transfers to the secondary side and is rectified by D3. Q1 and C7 catch the leakage energy and provide zero voltage switching. R16 is the current sense resistor. This signal is filtered by R15 and C8 and connects to the CS pin on the regulator IC.

Figure 5:
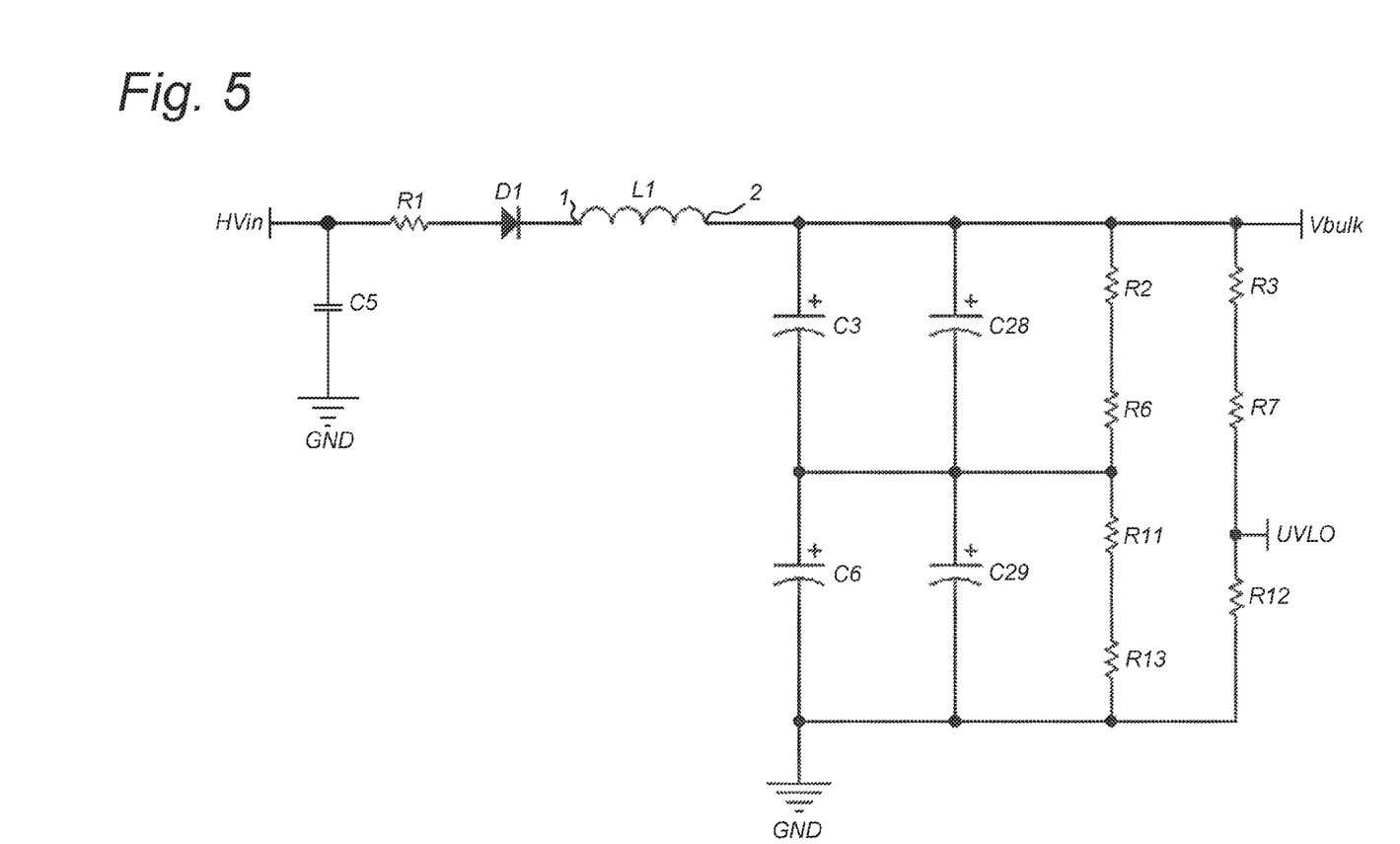
FIG. 5 shows an input filter.

In order to meet regulatory requirements, such as R10, it is desirable to filter both input and output. FIG. 5 shows the input filter. DC is applied via the spacer to HVin. D1 provides polarity protection. R1 is used as fuse in case of a short circuit. C5 filters residual noise. L1 and C3, C6, C28, C29 make up an LC filter to decrease the current ripple on the input. R2, R6, R11 and R13 make sure the input voltage divides evenly over the electrolytic capacitors. R3, R7 and R12 divide the input voltage such that 120 Vin equals 2.5V at the UVLO pin on the regulator IC. Vbulk is the filtered voltage.

Figure 6:
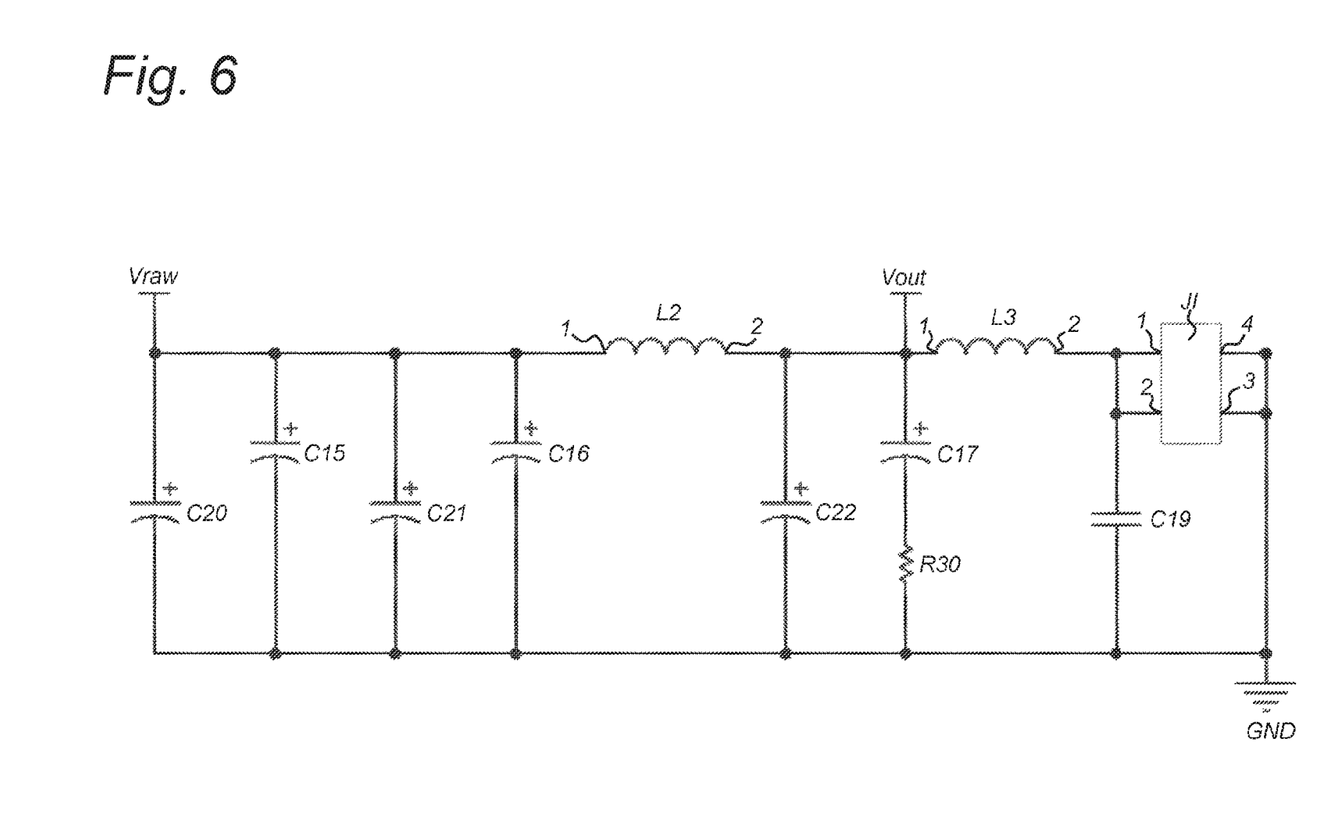
FIG. 6 shows an output filter.

FIG. 6 shows the output filter. Vraw is filtered by C20, C15, C21, and C16. Additional ripple reduction is achieved by the LC filter formed by L2 and C22. C17 and R30 damp the filter and assure stability when the connected load exhibits a negative impedance. L3 is a ferrite bead and, together with C19, filters out any residual switching noise that is left on the output.

Figure 7:
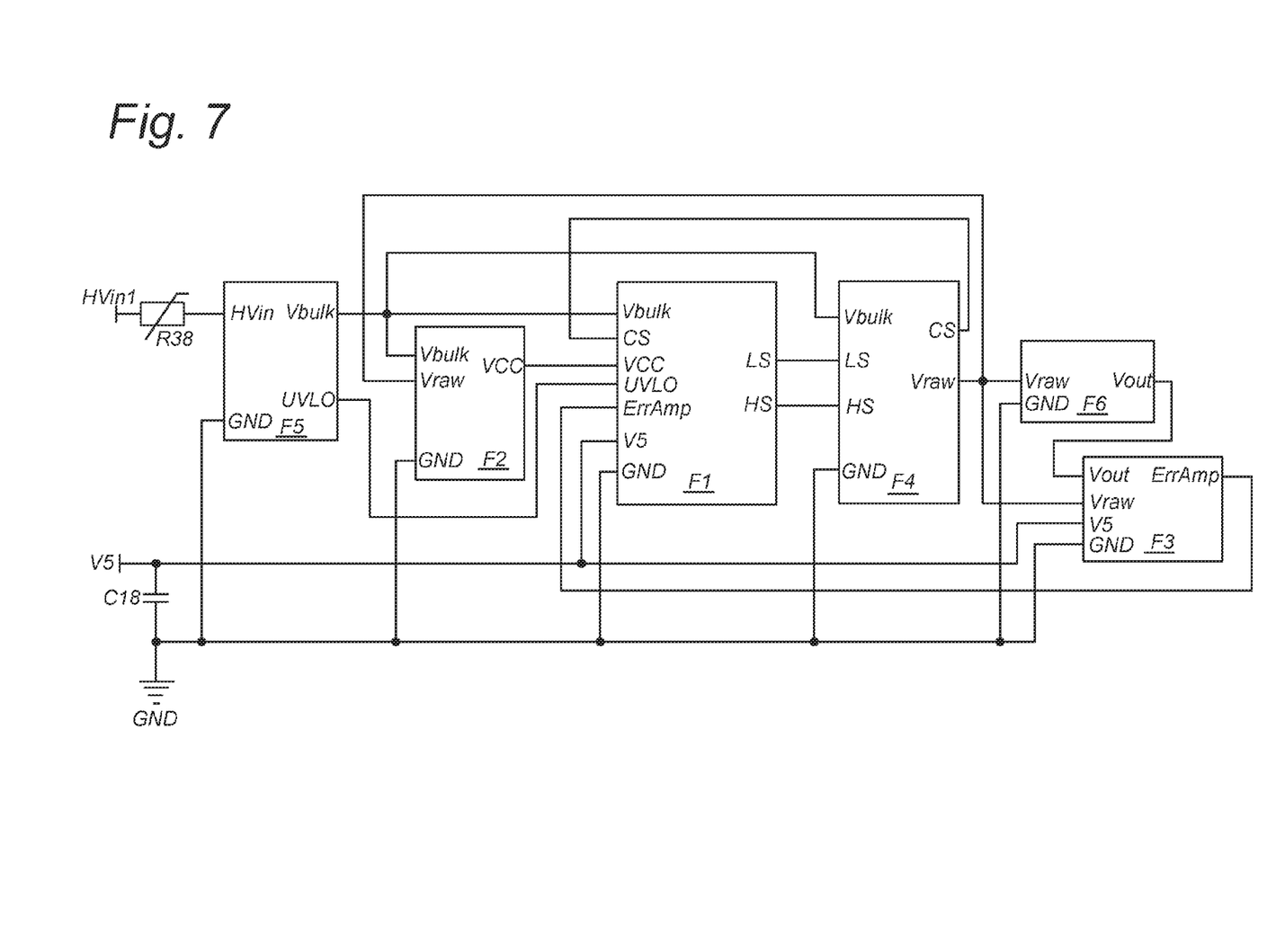
FIG. 7 shows a complete power converter with blocks as shown in FIGS. 1 to 6.

FIG. 7 shows the complete power converter with the blocks as shown in as described with reference to FIGS. 1 to 6. Blocks F1, F2, F3, F4, F5 and F6 in FIG. 7 refer to FIGS. 1, 2, 3, 4, 5 and 6, respectively.

Thus, the invention has been described by reference to certain embodiments discussed above. It will be recognized that these embodiments are susceptible to various modifications and alternative forms well known to those of skill in the art. For example, the converter may be modified by using another type of step-down converter. The controller or controllers may be connected to the vehicle's low voltage power supply, in addition to the high voltage converter, to provide emergency power.

Many modifications in addition to those described above may be made to the structures and techniques described herein without departing from the spirit and scope of the invention. Accordingly, although specific embodiments have been described, these are examples only and are not limiting upon the scope of the invention.

The invention claimed is:
1. A vehicle comprising:
a. a high voltage DC power source; and
b. a plurality of electric devices designed to be powered by the high voltage DC power source,
each of the plurality of electric devices being paired with a dedicated controller for controlling the operation of each respective electric device with which each dedicated controller is paired, the dedicated controllers being designed to be powered by a low voltage source,
wherein at least one of the electric devices comprises an electric motor designed to be powered by the high voltage power source,
wherein the dedicated controller of the electric motor comprises an inverter unit, the inverter unit having an input connected to the high voltage DC power source and having an output connected to the electric motor,
the inverter unit comprising:
a controller (F1) paired with the at electric motor for controlling the operation of the at electric motor, said controller being designed to be powered by a dedicated converter (F4) that, at least during supply of power to the electric motor by the inverter unit, is paired with a power input of the controller (F1), supplying power from the high voltage DC power source converted to low voltage power, powering the controller (F1) at the controller's power input.

2. The vehicle of claim 1, further comprising an additional electric motor for operating at least one of a water pump, an air compressor, a hydraulic pump, or an air conditioning compressor.

3. The vehicle of claim 2, wherein the converter is an isolated or non-isolated step-down converter.

4. The vehicle of claim 1, wherein the converter is an isolated or non-isolated step-down converter.

5. The vehicle of claim 4, wherein the converter has an operating high voltage range of from 150 V to 800 V.

6. The vehicle of claim 5, wherein the converter is a flyback converter.

7. The vehicle of claim 4, wherein the converter is a flyback converter.

8. The vehicle of claim 5, wherein the converter further comprises an active clamp controller.

9. The vehicle of claim 1, wherein the converter further comprises an input filter.

10. The vehicle of claim 1, wherein the converter further comprises a compensator.

11. The vehicle of claim 10, wherein the compensator does not comprise an optocoupler.

12. The vehicle of claim 1, wherein the converter comprises an output filter.

13. The vehicle of claim 1, which is a road vehicle.

14. The vehicle of claim 1, wherein the electric motor is an in-wheel electric motor.

\* \* \* \* \*